3,304,290
SYNTHETIC LINEAR POLYCARBONAMIDES HAVING AN IMPROVED RECEPTIVITY FOR ACID DYES
Richard D. Chapman, Durham, and Lawrence W. Crovatt, Jr., Raleigh, N.C., assignors to Monsanto Company, a corporation of Delaware
No Drawing. Filed Oct. 8, 1963, Ser. No. 314,631
7 Claims. (Cl. 260—78)

This invention relates to new and useful compositions of matter. More particularly, it relates to synthetic linear polycarbonamides having an improved receptivity for acid dyes and to a process for producing the same.

The polymeric substances with which this invention is concerned are synthetic, high molecular weight, fiber forming polycarbonamides of the general type characterized by the presence of recurring carbonamide groups as an integral part of the polymer chain, wherein such groups are separated by at least two carbon atoms. They are further characterized by high melting point, pronounced crystallinity, and insolubility in most solvents, except mineral acids, formic acid, and the phenols. Upon hydrolysis with strong mineral acids, the polymers revert to the reactants from which they were formed.

The simple polyamides of this type are usually made by heating substantially equimolecular proportions of a diamine with a dicarboxylic acid until the product has polymerized to the fiber-forming stage, which stage is not generally reached until the polyamide has an intrinsic viscosity of at least 0.4; the intrinsic viscosity being defined as $$\lim_{C \to 0} \left( \frac{\text{Log}_e O_r}{C} \right)$$

in which $N_r$ is the relative viscosity of a dilute solution of the polymer in m-cresol in the same units and at the same temperature, and C is the concentration in grams of polymer per 100 cc. of soluttion. The polymers thus obtained have high melting points and can be cold drawn to form strong, highly oriented fibers.

The diamines and dicarboxylic acids and amide-forming derivatives thereof which can be used as reactants to yield the simple fiber-forming polyamides are well known to the art. Suitable diamines may be represented by the general formula $$NH_2[CH_2]_nNH_2$$

in which $n$ is an integer of 2 or greater and preferably from 2 to 10. Representative examples are ethylene diamine, propylenediamine, tetramethylenediamine, pentamethylenediamine, hexamethylenediamine, octamethylenediamine and decamethylenediamine. Suitable dicarboxylic acid reactants are represented by the general formula HOOCRCOOH in which R is a divalent hydrocarbon radical having a chain length of at least two carbon atoms. These dicarboxylic acids are illustrated by sebacic acid, octadecanedioic acid, adipic acid, suberic acid, azelaic acid, undecanedioic acid, glutaric acid, pimelic acid, brassylic acid, and tetradecanedioic acid. The amide-forming derivatives of diamines which can be employed include the carbamate and N-formyl derivate. Suitable amide-forming derivatives of the dibasic carboxylic acids comprise the mono- an di-ester, the anhydride, the mono- and di-amide and the acid halide.

While it is known that textiles produced from the aforenoted polyamides have some affinity for acid dyestuffs, it is not enough to permit dyeing to the deep shades. Furthermore, the dye take-up rate is relatively slow and places limits on attainable productivity in the manufacture of dyed fabrics and other dyed articles.

Attempts have been made in the past to improve the dyeing characteristics of polyamide fibers and fabrics by treating the same with various chemical agents. However, the chemical treatment of an already formed polymer product merely facilitates dye absorption but does not increase the inherent capacity of the polymer for taking up more dye. Consequently, better methods for enhancing the dyeing characteristics of polyamide fibers and fabrics, particularly with respect to a capability for increasing the capacity of these polymers for taking up greater amounts of acid dyestuffs have been sought for a long time.

Accordingly, it is a principal object of the present invention to prepare synthetic linear polyamides which will dye to deep shades when dyed with acid type dyestuffs.

Another object is to prepare synthetic linear polyamides which will absorb acid dyes at an increased rate.

These and other objects will become apparent in the course of the following specification and claims.

In accordance with the present invention a fiber-forming synthetic linear polycarbonamide is prepared by reacting a polyamide-forming composition consisting of substantially equimolecular proportions of a dicarboxylic acid and a diamine in the presence of from about 0.1 to 10 percent, based on the weight of said polyamide-forming composition, of a polyhydroxy compound having the general formula:

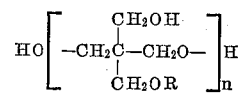

wherein $n$ is an integer up to about 10; and R is selected from the group consisting of H and the radical

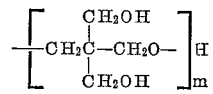

where $m$ is an integer from 1 to 3.

Examples of polyhydroxy compounds included within the scope of the aforenoted general formula and which are suitable for the purposes of the present invention are pentaerythritol, dipentaerythritol, tripentaerythritol, and tetrapentaerythritol.

The modified synthetic linear polyamides as described herein are prepared by procedures well-known in the art and commonly employed in the manufacture of simple polyamides. That is, the reactants are heated at a temperature of from 180° C. to 300° C. and preferably from 200° C. to 295° C. until the product has a sufficiently high molecular weight to exhibit fiber-forming properties. This condition is reached when the polyamide has an intrinsic viscosity of at least 0.4 in accordance with the definition of intrinsic viscosity as given hereinabove. The reaction can be conducted at superatmospheric, atmospheric, or sub-atmospheric pressure. Often it is desirable, especially in the last step of the reaction to employ conditions, e.g. reduced pressure, which will aid in the removal of the reaction by-products. The aforedescribed hydroxy compounds may be added to the polymerization autoclave with the polyamide-forming reactants or separately either before or after the polymerization reaction has begun. Another method of preparing the compounds of this invention is to blend the polyhydroxy compounds with molten polyamide prior to forming the desired shaped article, as for example filaments. The conventional polyamide-forming reactants are normally introduced as a pre-formed salt but may be in the form of uncombined diamine and dicarboxylic acid when added to the autoclave.

In order to illustrate the invention and the advantages thereof with greater particularity, the following specific examples are given, it should be understood that they are intended to be only illustrative and not limitative. Parts are given by weight unless otherwise indicated.

EXAMPLE I

This example illustrates the preparation of a conventional fiber-forming polyamide and is to be used as a standard of comparison with the modified polyamides of the present invention.

A solution of 147 parts of hexamethylene diammonium adipate (nylon 66 salt) dissolved in 153 parts of water was added to a stainless steel evaporator, which had previously been purged of air with purified nitrogen. The solution was then heated under a nitrogen blanket at a pressure of 13 p.s.i.g. with the continuous removal of steam condensate until the concentrated salt solution reached a temperature of 137° C. At this point the salt solution was charged to a stainless steel high-pressure autoclave. The autoclave had been previously purged of air by the use of the purified nitrogen. The temperature and pressure were slowly raised until values of 243° C. and 250 p.s.i.g. respectively were reached, during which time there was a continuous removal of steam as condensate. Also during this period the mixture was continuously agitated by means of a wall scraping blade contained within the autoclave. At this point the pressure reduction cycle began. The pressure was gradually reduced to atmospheric over a 25 minute period and the polymer melt was allowed to equilibrate for 30 minutes at 278° C. The finished polymer was cast as a continuous ribbon, cooled and cut into coarse flake-like particles. The polymer flake thus obtained was then melt spun through a 13 hole spinneret, yielding white multi-filament yarns. These yarns were godet drawn over hot (90° C.) alsimag pins to a draw ratio of 5.05 times their original length.

EXAMPLE II

A solution of 147 parts of hexamethylene diammonium adipate salt dissolved in 153 parts of water was added to a stainless steel evaporator, which had previously been purged of air with purified nitrogen. The solution was then heated under a nitrogen blanket at a pressure of 13 p.s.i.g. with the continuous removal of steam condensate until the concentrated salt solution reached a temperature of 137° C. At this point the salt solution was charged to a purged stainless steel high-pressure autoclave, into which had previously been placed 1.0 weight percent (based on the weight of the polymer) of pentaerythritol. The temperature and pressure were slowly raised until values of 243° C. and 250 p.s.i.g. respectively were reached, during which time there was a continuous removal of steam as condensate. Also during this period the mixture was continuously agitated by means of a wall scraping blade contained within the autoclave. At this point the pressure reduction cycle began. The pressure was gradually reduced to atmospheric over a 25 minute period and the polymer melt was allowed to equilibrate for 30 minutes at 278° C. The finished polymer was cast as a continuous ribbon, cooled and cut into coarse flake-like particles. The polymer flake thus obtained was then melt spun through a 13 hole spinneret, yielding white multi-filament yarns. These yarns were godet drawn over hot (90° C.) alsimag pins to a draw ratio of 5.50 times their original lengths.

EXAMPLE III

To polymer flake, as obtained in Example I, was added 0.60 weight percent (based on the weight of the polymer) of pentaerythritol. The mixture was charged to a stainless steel autoclave which has previously been purged of air by use of purified nitrogen. The mixture was then heated to 280° C. and melted during a period of approximately 60 minutes, during which time it was continuously agitated by means of a wall scraping blade contained within the autoclave. The finished polymer was then cast as a continuous ribbon, cooled and cut into coarse flake-like particles. The polymer chips thus obtained were melt spun through a 13 hole spinneret, yielding white multi-filament yarns. These yarns were godet drawn over hot (90° C.) alsimag pins to a draw ratio of 6.00 times their original length.

EXAMPLE IV

To polymer flake, as obtained in Example I, was added 2.25 weight percent (based on the weight of the polymer) of dipentaerythritol. The mixture was charged to a stainless steel autoclave which had previously been purged of air by the use of purified nitrogen. The mixture was then heated to 280° C. and melted during a period of approximately 60 minutes, during which time it was continuously agitated by means of a wall scraping blade contained within the autoclave. The finished polymer was then cast as a continuous ribbon, cooled and cut into coarse flake-like particles. The polymer chips thus obtained were melt spun through a 13 hole spinneret, yielding white multi-filament yarns. These yarns were godet drawn over hot (90° C.) alsimag pins to a draw ratio of 5.90 times their original length.

EXAMPLE V

A solution of 147 parts of hexamethylene diammonium adipate salt dissolved in 153 parts of water was added to a stainless steel evaporator, which had previously been purged of air with purified nitrogen. The solution was then heated under nitrogen blanket at a pressure of 13 p.s.i.g. with a continuous removal of steam condensate until the concentrated salt soltuion reached a temperature of 137° C. At this point the salt solution was charged to a purged stainless steel high-pressure autoclave, into which had previously been placed 5.0 weight percent (based on the weight of the polymer) of tripentaerythritol. The temperature and pressure was slowly raised until values of 243° C. and 250 p.s.i.g. respectively were reached, during which time there was a continuous removal of steam as condensate. Also during this period the mixture was continuously agitated by means of a wall scraping blade contained within the autoclave. At this point the pressure reduction cycle began. The pressure was gradually reduced to atmospheric over a 25 minute period and the polymer melt was allowed to equilibrate for 30 minutes at 278° C. The finished polymer was cast as a continuous ribbon, cooled and cut into coarse flake-like particles. The polymer flake thus obtained was then melt-spun through a 13 hole spinneret yielding white multi-filament yarns. These yarns were godet drawn over hot (90° C.) alsimag pins to a draw ratio of 4.65 times their original length.

In order to demonstrate the practical usefulness of the modified polyamides of the present invention, comparative tests of the above examples were conducted to determine relative receptivity for acid dyestuffs. Samples of the yarn of each of the above examples were dyed with comparable concentrations (7.5 percent based on the weight of the yarn) of the commercial dyestuff, Scarlet 4RA Conc. CF (C.I. Acid Red 18). The dyeing was conducted in a bath having a liquor to fiber ratio of 40:1 and a pH of 3.1. The bath temperature was maintained at 100° C., and the dyeing period was two hours in length. The dye absorption values were determined by measuring spectrophotometrically the changes in dye bath concentration, i.e., the difference between the original dye concentration and the dye concentration after equilibrium (saturation) conditions had been reached. The following results were obtained:

| Example: | $C_\infty$—equilibrium acid dye absorption value, percent |
|---|---|
| I (control) | 1.06 |
| II | 1.62 |
| III | 1.59 |
| IV | 2.34 |
| V | 3.06 |

From the above table, it is readily apparent that yarns prepared from polymers obtained in accordance with this invention are capable of absorbing substantially more acid dye than yarns prepared from conventional polyamides.

In order to further illustrate the principles and practice of the present invention, comparative dyeing rate measurements were made on Example I (Control) and Example V. The dye used was Scarlet 4RA Conc. CF (C.I. Acid Red 18) which was employed in a concentration of 3.0 percent (based on the weight of the yarn) in a dye bath having a liquor to fiber ratio of 40:1. The dye bath was maintained at a temperature of 60° C. The dyeing was carried out until the half-dyeing time was reached; i.e., the time required for the fiber to absorb one-half of its capacity. Specific dyeing rate constants were then determined in accordance with the following expression:

$$K' = 0.5 \ C_\infty \sqrt{d/t_{1/2}}$$

where
$K'$ = specific dye rate constant
$C_\infty$ = equilibrium acid dye absorption
$t_{1/2}$ = time of half-dyeing; i.e., time in minutes for the fiber to absorb one-half of its capacity of dye
$d$ = filament denier The following results were obtained in making the afore-described determinations:

| Example | $t_{1/2}$ (min.) | $C_\infty$, percent | K' |
|---|---|---|---|
| I (Control) | 209 | 1.06 | 0.116 |
| V | 46.6 | 3.06 | 0.704 |

In comparing the specific dye rate constants (K') in the above table, it is noted that the increase in rate of the modified polyamide (Example V) is better than five times that of the control (Example I).

It is apparent from the foregoing examples and the test data given in connection therewith that the modified polyamides of this invention are markedly improved over unmodified polyamides in their receptivity for acid dyestuffs. While applicants do not wish to be bound by any theory of operation, it is postulated that the polyamide modification in accordance with the present invention involves reaction between the modifying agent and the dicarboxylic acid. It is believed that the modifying agent reacts with the carboxylic end groups of the polyamide chains, and in many instances provides linking and cross-linking of said chains. Thus it can be seen that the resulting polymer has a greater number of free amine end groups that are available to be used as dye sites for acid dyes.

Although a particular acid dye was employed in the examples used to illustrate this invention, it is understood, of course, that the advantages of the invention are realized with all acid dyestuffs which are capable of dyeing polyamide articles. Benefits are also realized with other classes of dyes, such as neutral metal complex dyes, reactive dyes, premetalized dyes and others.

The modified polyamides of this invention are of primary interest for use in the manufacture of yarns and fabrics. They are, however, equally useful in other end products where an enhanced receptivity for dyes may be desired, e.g., bristles, films, moulded articles and the like.

In the preparation of the polyamides of this invention other modifying agents may be added, for example, delusterants, anti-oxidants, plasticizers, etc.

As many widely different embodiments of this invention may be made without departing from the spirit and scope thereof, it is to be understood that the invention is not to be limited by the specific embodiments set forth herein but only by the claims which follow.

We claim:
1. A fiber-forming synthetic linear polycarbonamide having recurring amide groups as an integral part of the main polymer chain, and wherein said groups are separated by at least 2 carbon atoms, which comprises the product obtained from reactants comprising (A) a polyamide-forming composition consisting of substantially equimolecular proportions of a dicarboxylic acid of the formula HOOCRCOOH wherein R is a divalent hydrocarbon radical having a chain length of at least 2 carbon atoms and a diamine of the formula $NH_2(CH_2)_nNH_2$ wherein $n$ is an integer of at least 2, and (B) from about 0.1 to 10 percent based on the weight of said polyamide forming composition of a polyhydroxy compound selected from a group consisting of pentaerythritol, dipentaerythritol, tripentaerythritol and tetrapentaerythritol.

2. The fiber-forming synthetic linear polycarbonamide as set forth in claim 1, wherein said polyamide-forming composition consists of substantially equimolecular proportions of adipic acid and hexamethylenediamine.

3. The fiber-forming synthetic linear polycarbonamide as set forth in claim 1, wherein said polyhydroxy compound is tetrapentaerythritol.

4. The fiber-forming synthetic linear polycarbonamide as set forth in claim 1, wherein said polyhydroxy compound is tripentaerythritol.

5. The fiber-forming synthetic linear polycarbonamide as set forth in claim 1, wherein said polyhydroxy compound is dipentaerythritol.

6. The fiber-forming synthetic linear polycarbonamide as set forth in claim 1, wherein said polyhydroxy compound is pentaerythritol.

7. A textile fiber composed of the polycarbonamide as defined in claim 1.

References Cited by the Examiner

UNITED STATES PATENTS 2,281,961 5/1942 Ufer et al. _____ 260—78

WILLIAM H. SHORT, *Primary Examiner.*

H. D. ANDERSON, *Assistant Examiner.*